INVENTOR.
EUGENE F. SULLIVAN

INVENTOR.
EUGENE F. SULLIVAN

United States Patent Office 3,736,205
Patented May 29, 1973

3,736,205
METHOD FOR ADHERING MATERIALS TOGETHER
Eugene F. Sullivan, San Jose, Calif., assignor to Keystone Consolidated Industries, Inc., Peoria, Ill.
Continuation-in-part of abandoned application Ser. No. 73,377, Sept. 17, 1970. This application Mar. 26, 1971, Ser. No. 128,248
Int. Cl. B32b 7/14
U.S. Cl. 156—291             11 Claims

ABSTRACT OF THE DISCLOSURE

A method for continuously attaching a length of magnetically attractable material to a length of a non-magnetically attractable material. The magnetically attractable material rests in contact with and adjacent to the other material, both being moved in unison along a support. Adhesive is applied at selected contacting positions of the magnetically attractable material and the other material where the two materials move past the inlet end of the support. An air blast shapes and cools the adhesive immediately after it is applied. Magnets in the support draw the magnetically attractable material against the other and maintain the two materials in a fixed, adjacent relationship. The adhesive sets as the two materials move to the discharge end of the support.

CROSS-REFERENCE TO RELATED APPLICATION

This application is a continuation-in-part of application Ser. No. 73,377, filed Sept. 17, 1970, by the same inventor, and now abandoned. The cross-referenced application Ser. No. 73,377 is incorporated herewith by reference.

BACKGROUND OF THE INVENTION

This invention relates to an improved method for continuously adhering a length of magnetically attractable material to an adjacent length of a non-magnetically attractable material, and it particularly relates to backing for a stucco wall coating.

It is not unusual to find applications in industry where a length of magnetically attractable material must be adhered to another material. One particularly important such application is in the manufacture of backing used for making a stucco wall coating.

The application of stucco coating requires cement to be applied over a "poultry netting" type wire netting which is positioned over a layer of water-resistant paper or similar material. The purpose of the wire netting is to reinforce and support the cement on the wall. The water-resistant paper acts as an insulator and also prevents moisture in the cement from permeating the wall that is being covered.

Stucco coating backing was traditionally assembled at the construction site. The water-resistant paper was first stapled to the wall to be coated and the wire netting was then stapled to the wall and over the paper. Thereafter, the cement coating is applied to the backing. In order to reduce construction costs, the wire netting and the water-resistant paper were pre-assembled by joining them together by wires. Since it was necessary to have holes in the paper so the wires could pass through, a second layer of paper was adhered to the paper-netting combination to ultimately provide a three-layer backing.

This prior art, while effective, did not provide a simple, economical and continuous method of attaching wire netting to a single sheet or layer of water-resistant paper. Such backing is the product of the present method invention and is the type disclosed in my copending U.S. patent application entitled, "Paperbacked Stucco Netting Material," Ser. No. 73,377, filed Sept. 17, 1970. That case discloses a wire netting, comprised preferably of a galvanized iron alloy formed in adjacent hexagon mesh sections, the netting being adhered to a single layer water-resistant material, such as asphalt impregnated kraft paper or coal tar kraft paper, by means of a hot melt adhesive.

SUMMARY OF THE INVENTION

It is thus an important object of the present invention to provide a simple and economical method for continuously attaching a magnetically attractable material to a non-magnetically attractable material.

A further object of the present invention is to provide a method for maintaining a magnetically attractable material in absolutely adjacent relationship to a second material as they move in unison, without slippage, longitudinally along an elongated support by the use of magnets in the support.

Yet another object of the present invention is to provide a method for continuously manufacturing a product comprising wire netting adhered to a continuous web by means of a hot melt adhesive.

Still another object of the present invention is to provide a method for making a base or backing for stucco coating, such backing being of the type having wire netting secured to a single layer of a waterproof sheet by an adhesive.

A further object of the present invention is to provide a method for continuously and economically making a stucco backing of the type which has a magnetically attractable wire netting secured by an adhesive to a single layer of waterproof material.

These and other objects, advantages and features of the present invention will appear as the specification proceeds.

The foregoing objects are accomplished by my method for continuously adhering a magnetically attractable material to another material. The magnetically attractable material, such as wire netting, rests on top of and contacts the other material at certain selected positions. An elongated support has elongated, spaced rows of magnets therein. The two materials are moved in unison longitudinally of the support. During such movement, the magnetically attractable material is drawn into contact with the second material by the magnets in the support. Adhesive is applied at selected positions of contact between the two materials at the inlet end of the support. The adhesive sets or hardens during the movement of the materials while the magnetically attracted material is drawn against the other material by the magnets.

BRIEF DESCRIPTION OF THE DRAWINGS

In the detailed description which follows, reference will be made to the drawings comprised of the following figures.

DESCRIPTION OF THE PREFERRED EMBODIMENT

While in the following specification, I describe a method for manufacturing a backing for stucco wall coverings, it is to be understood that the invention is not to be limited to a method for making such a product. The described method is considered to be particularly useful for adhesively securing a continuous length of a magnetically attractable material to a non-magnetically attractable material.

Figure 3:
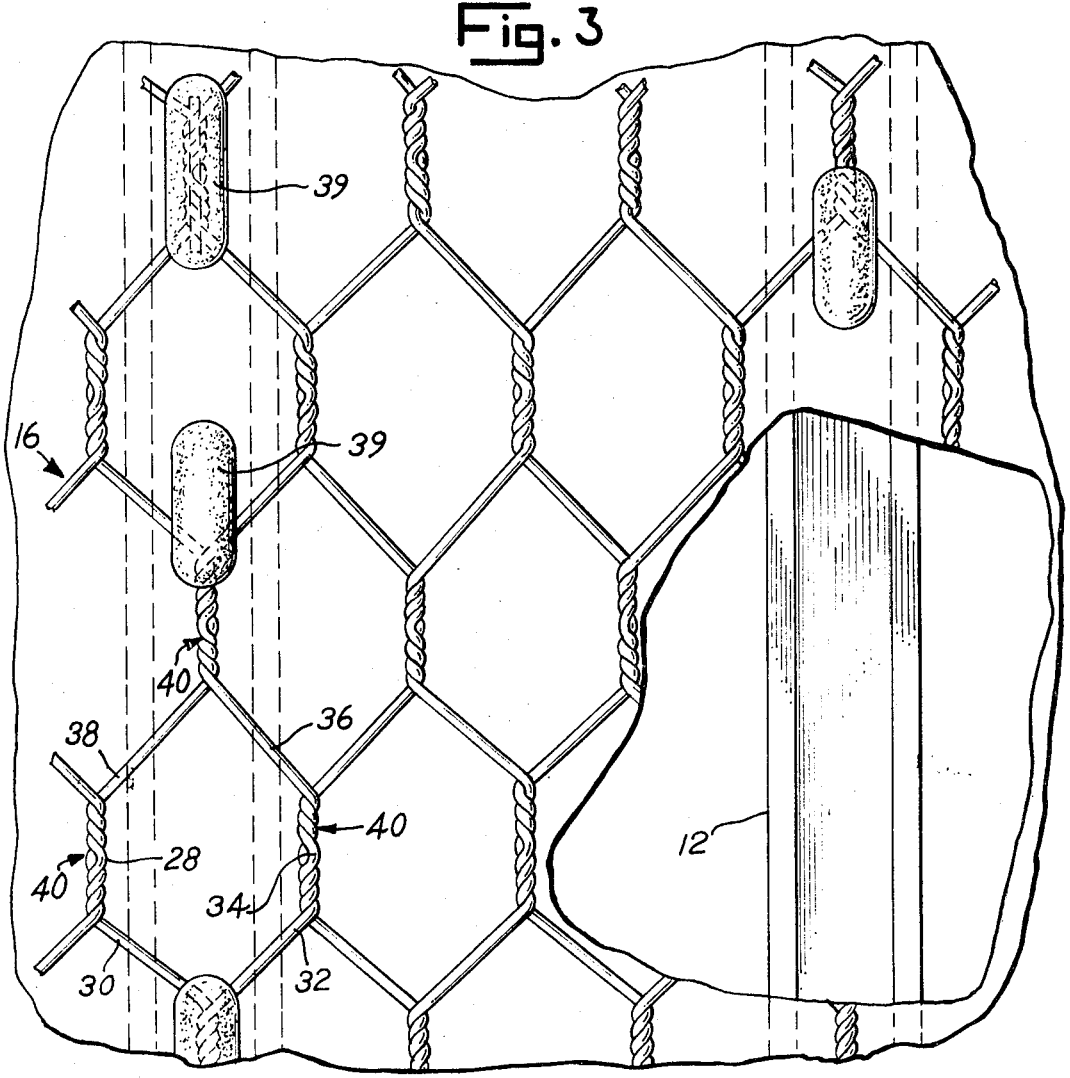
FIG. 3 is an enlarged top plan view of the wire netting adhered to a web, with a portion of the wire netting and web broken away to illustrate the location of magnets in the table below.
Figure 4:
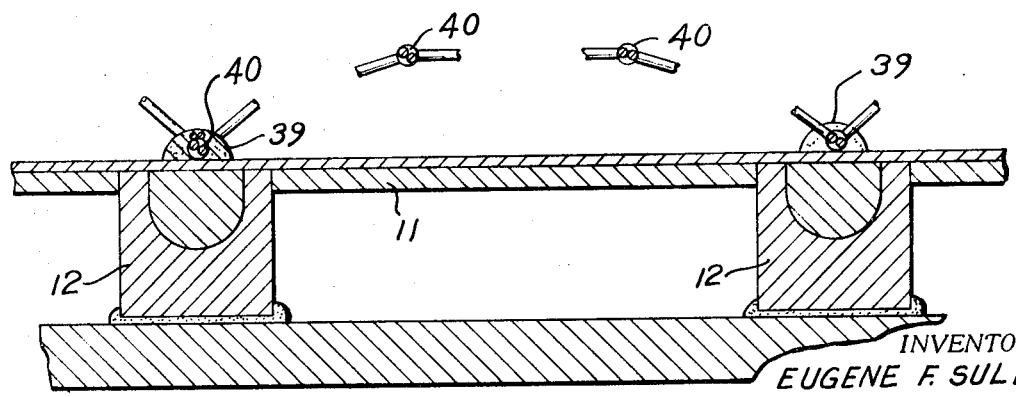
FIG. 4 is an end view of the embodiment of FIG. 3.

In the embodiment described herein, the magnetically attractable material comprises wire netting 16, of the type commonly referred to as "poultry netting." Such netting generally comprises galvanized iron alloy wire formed in a pattern of hexagon mesh sections, as seen, for example, in FIG. 3. Such galvanized iron alloy wire is responsive to magnetic force. Each mesh section has six sides 28, 30, 32, 34, 36 and 38. Adjacent sides 28 and 34 of two sections are twisted together to form the bonding or connecting twisted sections 40. These bonding sections 40 form the mesh netting. Some of the wire sections 40 are bent laterally outwardly of the plane of the netting, such procedure being commonly known as "furring." In such netting 16, the twists 40 are laterally spaced approximately one to one and one-half inches from each other.

The material to which the magnetically attractable wire netting 16 is to be adhesively joined is desirably a continuous web 14. In the embodiment described herein, the web 14 is a water-resistant paper material, such as an asphalt impregnated kraft paper. Suitable other materials for the web 14 include coal tar kraft paper and polyethylene sheets. The particular web 14 which is used depends on the specific use of the ultimate product of a webnetting combination.

The wire netting 16 and the web 14 are preferably joined together by use of a hot melt adhesive. Generally speaking, hot melt adhesives are polymer based, thermoplastic solids which become fluid when heated. An adhesive having a viscosity of less than 2000 centipoise at about 300–400° F. is advantageously utilized. One particular adhesive found to be useful in my process is available, under the designation HM–464–R, from the H. B. Fuller Co. Such adhesives are applied in the fluid state while the temperature is at approximately 350° F. Bonding of the netting 16 to the web 14 occurs when the adhesive cools and hardens or sets.

Figure 1:
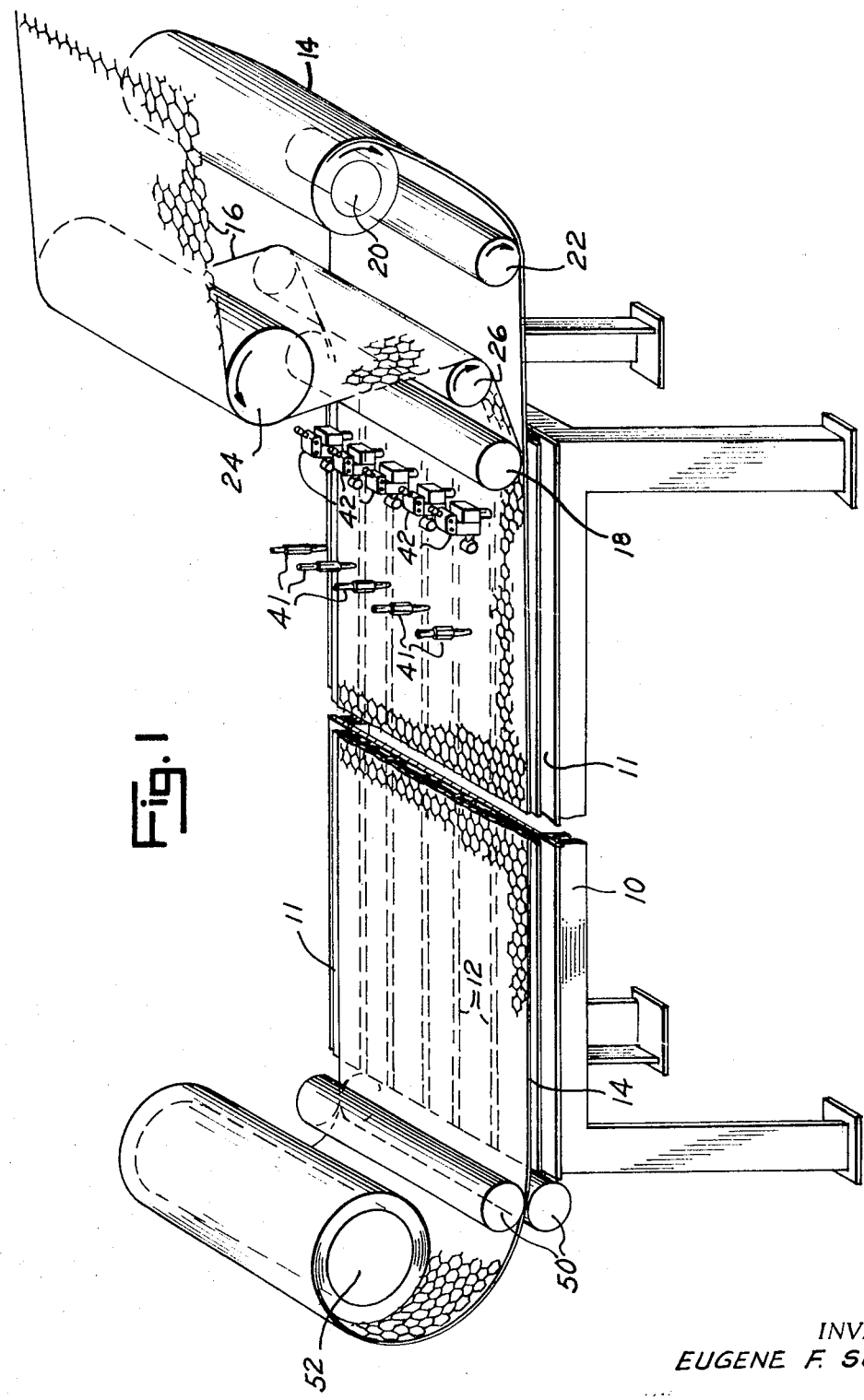
FIG. 1 is a schematic, perspective view of the equipment utilized in the practice of my method.
Figure 2:
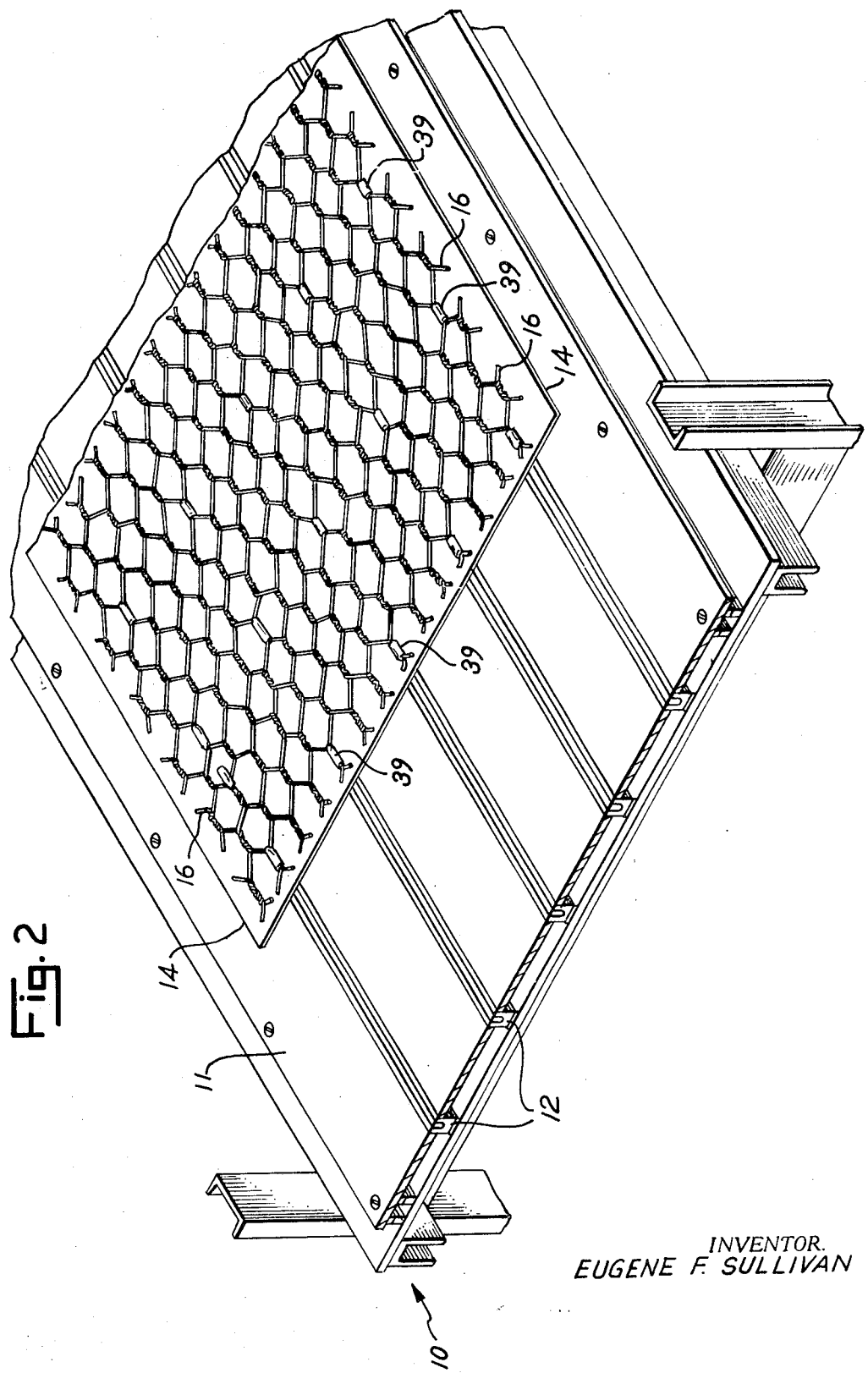
FIG. 2 is a perspective view of wire netting located over and against a web with both the web and the netting moving longitudinally along on an elongated table with magnets longitudinally mounted therein.

Referring particularly to FIG. 1, a table, generally 10, includes an upper support surface 11 having magnets 12 mounted therein. Although support surface 11 is illustrated in a substantially horizontal position, it is not intended to so limit the invention. The present method could be utilized with the support surface 11 being displaced at any suitable angle as long as the web 14 is interposed between the wire netting 16 and the magnets 12. Preferably, the support surface or table top 11 is made of a non-magnetic material, such as an austenitic stainless steel. Longitudinal grooves, substantially parallel with elongated sides of the support surface 11, are provided in the surface 10. A plurality of such grooves is provided and each groove extends substantially for the entire length of the table. These grooves are laterally spaced approximately 6 inches part.

The magnets 12 are securely mounted in the longitudinal grooves and are desirably secured therein by use of a suitable adhesive, such as an epoxy resin. Desirably, the magnets 12 are the permanent magnet type. Each magnet 12 is approximately one-half inch in width the approximate width of the grooves, and approximately six inches in length. The magnets 12 in vertical cross-section are U-shaped or horseshoe shaped. The magnets 12 are preferably made of Alnico 5, commonly used for the manufacture of permanent magnets. The magnets 12 desirably have a flux density of about 1000–1500 gauss. The flux density, however, may be varied depending upon the thickness of the wire in the magnetically attractable wire netting 16, the distance between the magnets 12 and the wire netting 16, and the type and thickness of material interposed between the netting 16 and the magnets 12.

The flat upper, polar ends, of the U-shaped magnets 12 are substantially flush with the support surface 11. The one-half inch width of the magnets 12 assures substantial alignment with the twists 40 in the netting 16 and provide sufficient tolerance for lateral misalignment of the netting 16 as it is moved longitudinally across the support surface 11, in a manner to be hereinafter described. The open central portion of the U-shaped magnets 12 and any space between the sides of the grooves and the magnets 12 are desirably filled with non-magnetic material so that the top of the surface 11 is smooth and continuous for slidably supporting the web 14 as it moves longitudinally along the surface 11.

The attractive force of the magnets 12 for the netting 16 may be reduced by increasing the lateral spacing between the wire netting twists 40 and the longitudinally mounted magnets 12. Also such magnetic attraction may be decreased by interposing an additional thickness of non-magnetic material between the magnets 12 and the magnetically attractable wire netting 16. In certain applications, it is desirable to reduce the magnetic attraction because, if the magnetic force is too great, the desired free movement of the material or web 14 on the table is adversely affected by increased frictional force resulting from the excessive magnetic force. The attractive force between the magnets 12 and the wire netting 16 should, however, be sufficiently high to hold the wire netting 16 firmly against the web 14 without having adverse relative movement therebetween. Relative movement between the web 14 and netting 16 as the adhesive sets will have an adverse effect upon the bond. Electromagnets (not shown) may be used rather than permanent magnets 12 so the flux density may be electrically varied depending on the particular application or materials being joined together.

Referring particularly to FIG. 1, the continuous web or backing paper 14 is mounted on a horizontal, rotatable storage roller 20. The paper web 14 is introduced to the inlet end of the table 10 by an idler roller 22, which is positioned forwardly of the inlet end and is mounted with its axis transverse of the longitudinal axis of the web 14. The web 14 is fed directly on to the support surface 11.

The wire netting 16 is fed continuously to the support surface 11 from a wire netting machine (not shown) and is trained around horizontally and transversely mounted rollers 24, 26, and 18. Alternatively, wire netting 16 may be mounted on a storage roller (not shown) similar to the web storage roller 20. The wire netting 16 is fed to a position adjacent and above the web 14 on the support surface 11.

The netting 16 and web 14 are fed between drive or pinch rollers 50 located at the discharge or outlet end of the table 10. These pinch rollers 50 pull the web 14 and wire netting 16 in unison longitudinally along the elongated support surface from its inlet end to its discharge end. The wire netting-web product is wound on a rotatably mounted storage roller 52.

A plurality of adhesive dispensers 42 is located near the inlet end of the table 10 slightly above the upper side of the netting 16, and beyond the roller 18. The dispensers 42 are mounted on a suitable support (not shown) and are connected to a source (not shown) of adhesive. The adhesive is discharged from the dispensers 42 intermittently to pre-selected positions of the wire netting 16, preferably at spaced twists 40, in order to join the wire netting 16 to the web 14, the bent side of the twists 40 being against the web 14. The dispensers 42 are aligned above the magnets 12 in the support surface 11 and the twisted sections 40 of the netting 16 are aligned between the dispensers 42 and the magnets 12. In this way, the magnets 12 attract the outwardly bent portions of the twisted secions 40 against or in substantial contact with the upper surface of the web 14 and the dispensers 42 each deposit a row of longitudinally spaced hot melt adhesive spots or deposits 39 to twists 40. Suitable adhesive dispensers 42 are of the gun type and are commercially available from Nordson Corporation under Model No. H-20B.

Immediately after being deposited and while still quite hot and fluid, the hot melt adhesive passes under nozzles 41 which direct blasts of air having a velocity in the neighborhood of 3,000 to 4,000 feet per minute toward said deposits. This blast of air causes the deposits to flow laterally which serves two purposes. It increases the area of contact between the adhesive and the paper, which gives the bond a greater strength, and secondly, it causes the deposit to become thinner in its vertical dimension. This thinner section reduces the cooling or setting time of the adhesive considerably. It is understood that the cool air blast, illustrated in FIG. 1 as occurring right after the adhesive is deposited, may extend for the full length of the support surface 11.

By the time the web-netting combination passes between the pinch rollers 50, the adhesive is hardened or set. The length of the table 10 is therefore a function of the time required for the adhesive to set. In the embodiment shown, using the adhesive described, the table 10 is approximately 20 feet in length and approximately 7 feet in width, the width only being a function of the width of the netting and the web. After passing through the pinch rollers 50, the netting-web product is wound on the storage roller 52.

In practicing my method, the web 14, wound on the storage roller 20 is fed by the roller 22 to the inlet end of the table 10 and under the roller 18. The wire netting 16 is thereafter positioned on top of the web 14, and also beneath the idler roller 18. The two materials are manually pulled in unison along the length of the table 10 and are fed together between the pinch rollers 50. The lateral edges of the web 14 and netting 16 are positioned in substantial alignment and the twisted sections 40 of the magnetically attractable netting 16 are positioned substantially directly above the magnets 12. When the web 14 and netting 16 are in proper lateral alignment on the table, the pinch rollers 50 are driven by suitable drive means and the product is wound on the storage roller 52. The operation is then ready for continuous operation.

The pinch rollers 50 pull the web-netting combination longitudinally along the table at a predetermined speed. Adhesive dispensers 42 are activated so that longitudinally spaced spots of adhesive 39 are applied, preferably at the bonding twists 40 of the netting 16. The magnets 12 magnetically attract the netting 16, and particularly the twisted sections 40 thereof, against the upper surface of the web 14. Desirably, the adhesive is dropped in spots 39 which the air blast shapes to be approximately .40 inch in width, .06 inch high, and one inch long. Desirably, these adhesive spots 39 are at about nine inch intervals in parallel rows above the magnets 12.

The netting 16 and web 14 are moved in unison along the support surface 11 so as to maintain the netting 16 against the web 14 while the adhesive spots 39 are setting or cooling. After the adhesive sets, the joined web-netting combination is fed between the pinch rollers 50. In the specific example described, the netting 16 and the web 14 advance along the support surface 11 at about 42 feet per minute. The netting 16 and paper web 14 are held together by the magnets for about 25 seconds in order for the hot melt adhesive to cool from its application temperature of about 350° F. to its setting temperature of about 160° F. The twenty foot support surface 11 is the distance that the netting 16 and web 14 travel in a period of about 28 seconds so there is assurance that the adhesive is set prior to reaching the pinch rollers 50. The web-netting product is wound around the storage roller 52.

While in the foregoing there has been provided a detailed description of a particular embodiment of the present invention, it is to be understood that all equivalents obvious to those having skill in the arts are to be included within the scope of the invention, as claimed.

What I claim is:

1. A method for adhering a first, magnetically attractable material to a second planar sheet of non-magnetically attractable material, said method comprising the steps of:
    arranging said first magnetically attractable material to rest adjacent to said second material;
    moving said materials in unison from a first position to a second position while
    supporting said materials by fixed non-movable support means;
    magnetically attracting said first magnetically attractable material against said second non-magnetically attractable material during said moving step by magnetic means fixed relative to said moving material and said fixed support means;
    applying adhesive to selected sections of said adjacent first and second materials at said first position; and
    continuing to move said materials to said second position for setting said adhesive thereby for joining said first and second materials together.

2. The method of claim 1 wherein said first magnetically attractable material is arranged to contact said second material at pre-selected positions, said magnetically attracting step occurs at said selected positions, and said adhesive is applied at at least some of said positions.

3. The method of claim 1 wherein said materials are moved continuously from said first position to said second position and said adhesive is applied intermittently at preselected adjacent positions between said first and second materials.

4. The method of claim 1 wherein said adhesive is a hot melt adhesive and is applied in the heated fluid condition, and said adhesive is cooled and laterally spread as said materials continue to move to said second position for setting said adhesive.

5. The method of claim 4 wherein said adhesive is cooled and laterally spread by a blast of air.

6. The method of claim 1 wherein said materials are moved in unison in a substantially horizontal direction while vertically supporting said materials.

7. A method for adhering magnetically attractable wire netting to a substantially continuous waterproof web to provide a stucco backing, said method comprising the steps of:
    arranging said wire netting to rest adjacent to said web;
    moving said netting and said web in unison from an inlet position to an outlet position while supporting said web and said netting by support means fixed relative to said web;
    magnetically attracting preselected portions of said wire netting to a position against said web during said moving step;
    applying a hot melt adhesive to said preselected portions while said web and said netting are passing said inlet position; and
    continuing to move said wire netting and said continuous web to said outlet position as said hot melt adhesive cools and sets.

8. The method of claim 7 wherein said wire netting is arranged to contact said web at preselected positions, said magnetically attracting step occurring at said selected positions, and said hot melt adhesive is applied at at least some of said positions.

9. The method of claim 7 wherein said wire netting and said web are moved in a substantially horizontal direction in unison from an inlet position to an outlet position while vertically supporting said web and said netting, and said adhesive is applied intermittently at preselected adjacent positions between said wire netting and said web.

10. The method of claim 7 wherein said hot melt adhesive is applied in the heated fluid condition, and said adhesive is cooled and laterally spread as said materials continue to move to said outlet position.

11. The method of claim 10 wherein said hot melt adhesive is cooled and laterally spread by a blast of air.

References Cited

UNITED STATES PATENTS

| | | | |
|---|---|---|---|
| 1,799,750 | 4/1931 | Hummert | 52—454 |
| 1,730,935 | 10/1929 | Hicks | 52—454 X |
| 2,139,749 | 12/1938 | Herbest, Jr. | 52—661 |
| 3,376,629 | 4/1968 | Baumann et al. | 52—454 |
| 3,642,118 | 2/1972 | Kornylak | 198—41 |
| 3,581,872 | 6/1971 | Grossjohann | 198—41 |
| 3,578,144 | 5/1971 | Punzak | 198—41 |
| 3,523,602 | 8/1970 | Mojoen et al. | 198—41 |
| 3,468,406 | 9/1969 | Spodig. | |
| 3,428,163 | 2/1969 | Hershey. | |

NORMAN G. TORCHIN, Primary Examiner

E. C. KIMLIN, Assistant Examiner

U.S. Cl. X.R.

214—114; 52—454